(12) United States Patent
Lin et al.

(10) Patent No.: US 10,160,646 B2
(45) Date of Patent: Dec. 25, 2018

(54) WASTE HEAT RECOVERY APPARATUS AND WASTE HEAT RECOVERY METHOD

(71) Applicant: Industrial Technology Research Institute, Hsinchu (TW)

(72) Inventors: Yu-Li Lin, Chiayi (TW); Ting-Wei Huang, Hsinchu (TW); Meng-Chang Lin, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 301 days.

(21) Appl. No.: 14/337,242

(22) Filed: Jul. 22, 2014

(65) Prior Publication Data

US 2015/0027053 A1 Jan. 29, 2015

(30) Foreign Application Priority Data

Jul. 23, 2013 (TW) .............................. 102126315 A (51) Int. Cl.
*C10J 3/86* (2006.01)
*C01B 3/38* (2006.01)

(52) U.S. Cl.
CPC ........ *C01B 3/38* (2013.01); *C01B 2203/0233* (2013.01); *C01B 2203/0811* (2013.01); *C01B 2203/1241* (2013.01); *C01B 2203/1247* (2013.01); *Y02P 20/124* (2015.11); *Y02P 20/129* (2015.11)

(58) Field of Classification Search
CPC ..... C01B 2203/0811; C01B 2203/1294; F01N 5/02; F01N 2240/30
See application file for complete search history.

(56) References Cited

U.S. PATENT DOCUMENTS

| | | | |
|---|---|---|---|
| 6,935,282 B2 | 8/2005 | Ohnemus | |
| 7,089,888 B2 | 8/2006 | Mirji | |
| 7,296,400 B2 | 11/2007 | Nakada | |
| 7,799,314 B2 | 9/2010 | Agnihotri et al. | |

(Continued)

FOREIGN PATENT DOCUMENTS

| | | |
|---|---|---|
| CN | 1211678 | 3/1999 |
| CN | 1406861 | 4/2003 |

(Continued)

OTHER PUBLICATIONS

"Office Action of China Counterpart Application," dated Mar. 24, 2016, p. 1-p. 13.

(Continued)

*Primary Examiner* — Imran Akram
(74) *Attorney, Agent, or Firm* — JCIPRNET (57) ABSTRACT

Provided is a waste heat recovery apparatus including a first heat exchanger, a reformer and a reformer feed pre-heater sequentially disposed on or in the waste gas exhaust pipe from the upstream to the downstream thereof, wherein the waste gas temperature at the upstream of the waste gas exhaust pipe is higher than that at the downstream. In an embodiment, the reformer can be a hydrogen-generation reformer, and the generated hydrogen is introduced into the burning equipment for use. In such manner, the waste heat can be effectively utilized, and the carbon deposition issue inside the burning equipment can be fixed. A waste heat recovery method is also provided.

17 Claims, 4 Drawing Sheets

(56) References Cited

U.S. PATENT DOCUMENTS

| | | | |
|---|---|---|---|
| 8,015,952 B2 | 9/2011 | Pursifull | |
| 2003/0101713 A1* | 6/2003 | Dalla Betta | B01D 53/9431 60/284 |
| 2005/0081514 A1 | 4/2005 | Nakada | |
| 2005/0274107 A1* | 12/2005 | Liu | B01J 8/0438 60/286 |
| 2006/0151156 A1* | 7/2006 | Valensa | C01B 3/382 165/167 |
| 2007/0056268 A1* | 3/2007 | McCarthy, Jr. | F01N 3/0814 60/286 |
| 2007/0137191 A1* | 6/2007 | Kweon | C01B 3/34 60/320 |
| 2007/0256407 A1* | 11/2007 | Reuter | F01N 3/0253 60/286 |
| 2008/0016849 A1* | 1/2008 | McCarthy | F01N 3/0253 60/286 |
| 2008/0022661 A1* | 1/2008 | Yan | F01N 3/0253 60/286 |
| 2008/0110420 A1 | 5/2008 | Ishimaru et al. | |
| 2008/0168763 A1* | 7/2008 | Ginter | B01D 53/9418 60/286 |
| 2008/0282670 A1* | 11/2008 | McCarthy, Jr. | F01N 3/0871 60/274 |
| 2010/0077734 A1* | 4/2010 | Shamis | F01N 3/0253 60/286 |
| 2010/0254893 A1* | 10/2010 | Kim | C01B 3/384 423/655 |
| 2010/0275582 A1* | 11/2010 | Wada | B01D 53/944 60/276 |
| 2010/0300382 A1* | 12/2010 | Yahagi | C01B 3/323 123/3 |
| 2010/0330446 A1* | 12/2010 | Lucka | C01B 3/382 429/425 |
| 2011/0067410 A1* | 3/2011 | Zubrin | F01K 13/00 60/780 |
| 2012/0145096 A1* | 6/2012 | Shimada | F01N 5/02 123/3 |

FOREIGN PATENT DOCUMENTS

| | | |
|---|---|---|
| CN | 101338711 | 1/2009 |
| CN | 101323431 B | 8/2010 |
| CN | 101842314 A | 9/2010 |
| CN | 201679586 U | 12/2010 |
| CN | 102274689 | 12/2011 |
| CN | 102425509 | 4/2012 |
| JP | H10334936 | 12/1998 |
| JP | 2004144018 | 5/2004 |
| JP | 2004299924 | 10/2004 |
| JP | 2009140695 | 6/2009 |
| JP | 2011051860 | 3/2011 |
| TW | 261210 | 10/1995 |
| TW | M298087 | 9/2006 |
| TW | I310003 | 5/2009 |
| TW | I329703 | 9/2010 |
| TW | I340792 | 4/2011 |
| TW | I366300 | 6/2012 |

OTHER PUBLICATIONS

"Office Action of Taiwan Counterpart Application", dated Nov. 13, 2014, p. 1-p. 7.

Jou et al., "Enhancing the performance of a high-pressure cogeneration boiler with waste hydrogen-rich fuel", International Journal of Hydrogen Energy May 2008, pp. 5806-5810.

Jou et al., "Reduction of Greenhouse Gas Emission through Applying Hydrogen-Rich Fuel on Industrial Boiler", Practice Periodical of Hazardous, Toxic, and Radioactive Waste Management Oct. 2008, pp. 270-274.

Alexander A. Konnov, "Remaining uncertainties in the kinetic mechanism of hydrogen combustion" Combustion and Flame Mar. 2008, pp. 507-528.

G. L. Juste, "Hydrogen injection as additional fuel in gas turbine combustor. Evaluation of effects", International Journal of Hydrogen Energy Nov. 2006, pp. 2112-2121.

Lee et al., "Improvements in the performance of a medium-pressure-boiler through the adjustment of inlet fuels in a refinery plant", Fuels vol. 86, Issues 5-6, Mar.-Apr. 2007, pp. 625-631.

Jou et al. "Reduction of Energy Cost and CO2 Emission for the Boilers in a Full-Scale Refinery Plant by Adding Waste Hydrogen-Rich Fuel Gas", Energy & Fuels Jan. 2008, pp. 564-569.

Chin-Tsan Ho, "Performance Simulation and Cost-Benefit Analysis of the Hydrogen Addition Effects on the Combined-Cycle Unit (Based on the Dah-Tarn Power Plant)", Thesis of Department of Mechanical Engineering, National Central University, Jul. 2008, pp. 1-85.

"Office Action of Japanese Counterpart Application", dated Jun. 23, 2015, p. 1-p. 3.

\* cited by examiner

WASTE HEAT RECOVERY APPARATUS AND WASTE HEAT RECOVERY METHOD

CROSS-REFERENCE TO RELATED APPLICATION

This application claims the priority benefit of Taiwan application serial no. 102126315, filed on Jul. 23, 2013. The entirety of the above-mentioned patent application is hereby incorporated by reference herein and made a part of this specification.

TECHNICAL FIELD

The technical field relates a waste heat recovery apparatus and a waste heat recovery method.

BACKGROUND

Burning equipment such as various steam boilers and burners usually exhausts a great amount of waste heat but fails to exhaust 100% of the fuel. Accordingly, combustible constituent is usually provided in such exhausted atmosphere. In addition to incomplete combustion, the fuel with longer carbon chain (e.g., heavy oil, diesel oil, etc.) can cause issues including serious carbon deposition, malodorous waste exhaustion and so on. Those issues not only reduce operation life and performance of the equipment but also result in environmental contaminations.

Even if the equipment is constantly maintained, performance degradation can still occur to increase energy consumption. Based on information provided by domestic boiler providers, the energy cost consumed during the life circle of a boiler occupies more than 99% of the total investment cost (including equipment purchase, energy, maintenance, etc.) thereof, which is far higher than the equipment procurement cost. This indicates that the most important factor of cost control in related technology of the boiler is to reduce use of energy.

Therefore, the boiler industry has been highly concerned about agendas involving how to improve energy efficiency while reducing costs, specifically, how to effectively utilize waste heat of the boiler while reducing the carbon deposition and incrustation.

SUMMARY

One of exemplary embodiments provides a waste heat recovery apparatus, which includes a first heat exchanger, a reformer and a reformer feed pre-heater sequentially disposed from the upstream to the downstream of a waste gas exhaust pipe, wherein the waste gas temperature at the upstream of the waste gas exhaust pipe is higher than that at the downstream. An end of the reformer feed pre-heater is connected to a feeder for a reformer feed, and another end of the reformer feed pre-heater is connected to the reformer. Besides, the reformer is installed with a temperature controller to control a temperature inside the reformer.

Another of exemplary embodiments provides a waste heat recovery method, which includes providing a combustion waste gas produced by a burning equipment, and sequentially passing the combustion waste gas through a first heat exchanger, a reformer and a reformer feed pre-heater, wherein the heat extraction temperature of the first heat exchanger is higher than that of the reformer, and the heat extraction temperature of the reformer is higher than that of the reformer feed pre-heater. An end of the reformer feed pre-heater is connected to a feeder for a reformer feed, and another end of the reformer feed pre-heater is connected to the reformer. Besides, the reformer is installed with a temperature controller to control a temperature inside the reformer.

Another of exemplary embodiments provides a waste heat recovery apparatus, which includes a first heat exchanger, a reformer and a reformer feed pre-heater sequentially arranged, wherein a waste gas exhaust pipe is connected to a burning equipment, the first heat exchanger and the reformer are disposed in the burning equipment, and the reformer feed pre-heater is disposed in the waste gas exhaust pipe. An end of the reformer feed pre-heater is connected to a feeder for a reformer feed, and another end of the reformer feed pre-heater is connected to the reformer. Besides, the reformer is installed with a temperature controller to control a temperature inside the reformer.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION

In the following detailed description, for purposes of explanation, numerous specific details are set forth in order to provide a thorough understanding of the disclosed embodiments. It will be apparent, however, that one or more embodiments can be practiced without these specific details. In other instances, well-known structures and devices are schematically shown in order to simplify the drawing.

Figure 1A:
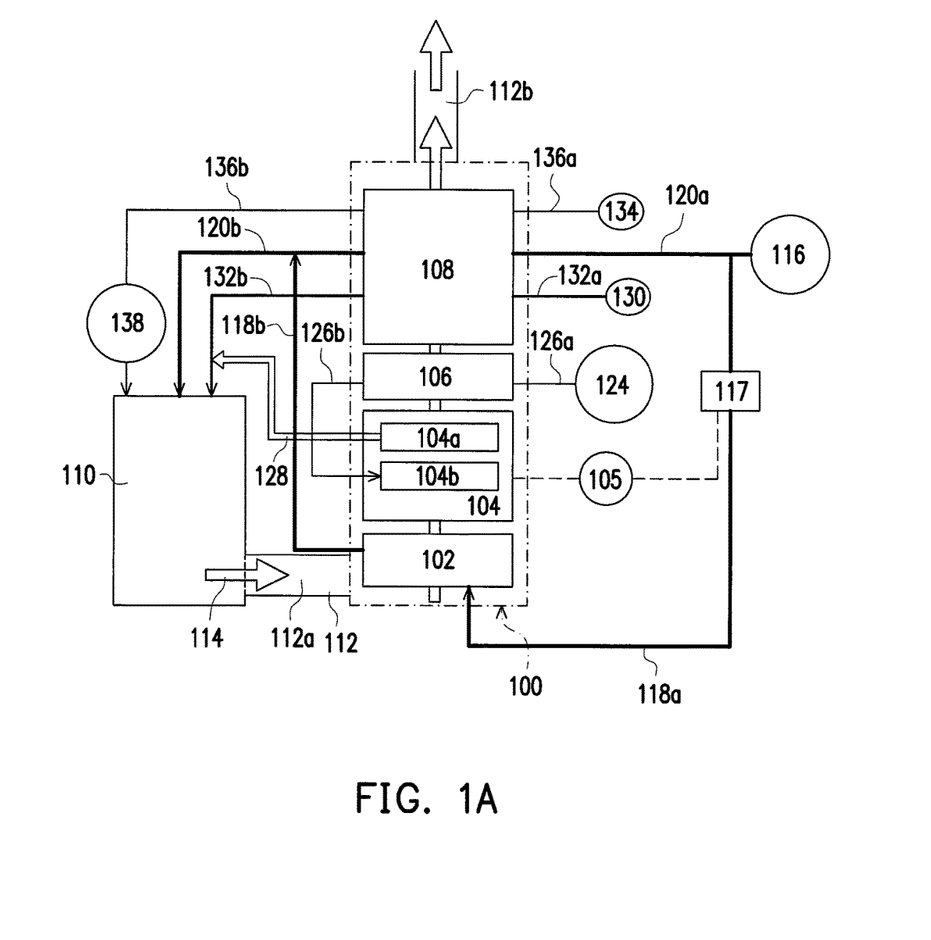
FIG. 1A is a block diagram illustrating a waste heat recovery apparatus according to an exemplary embodiment of the present disclosure.

FIG. 1A is a block diagram illustrating a waste heat recovery apparatus according to an exemplary embodiment of the present disclosure. Referring to FIG. 1A, the waste heat recovery apparatus 100 of the present disclosure includes a first heat exchanger 102, a reformer 104, a reformer feed pre-heater 106 and a second heat exchanger 108 sequentially disposed from the upstream 112a to the downstream 112b of a waste gas exhaust pipe 112. The upstream 112a of the waste gas exhaust pipe 112 can be regarded as an entrance for receiving a high temperature waste gas (or known as a flue gas), and the downstream 112b thereof can be regarded as an exit at end of the pipe. In addition, the arrangement of the first heat exchanger 102, the reformer 104, the reformer feed pre-heater 106 and the second heat exchanger 108 inside the waste gas exhaust pipe 112 does not affect flowing of the high temperature waste gas. The waste gas temperature at the upstream 112a is higher than that at the downstream 112b. In an embodiment, the waste gas temperature at the upstream 112a is approximately 200° C. to 400° C., and the waste gas temperature at the downstream 112b is approximately 100° C. to less than 200° C.

The waste gas exhaust pipe 112 is connected to a burning equipment 110. The burning equipment 110 includes a boiler, such as a vertical boiler or a horizontal boiler. A flue gas flow direction 114 indicates a flow direction of the combustion waste gas of the burning equipment 110. Specifically, the combustion waste gas flows in the waste gas exhaust pipe 112 from the upstream 112a to the downstream 112b, and is sequentially passed through the first heat exchanger 102, the reformer 104, the reformer feed pre-heater 106 and the second heat exchanger 108.

The reformer 104 of the present disclosure can be a hydrogen-generation reformer. The reformer 104 utilizes a waste heat as a heating source to transform a fossil fuel and therefore generate a hydrogen-containing gas. The generated hydrogen-containing gas is sent to the burning equipment 110 for mixing and burning together with a fuel feed used therein, so as to improve the burning efficiency and thereby reduce the amount of the fuel being used, the carbon deposition and the malodorous waste exhaustion. In an embodiment, the reformer 104 has an entrance and an exit for fluids (not illustrated), and includes a catalyst bed 104a filled with metal or non-metal catalysts capable of transforming a mixture of a reformer feed and water into hydrogen. The generated hydrogen is connected to the burning equipment 110 through pipes 128 and 132b. Namely, the pipe 128 transfers the hydrogen produced by the reformer 104, and the pipe 132b transfers the fuel feed which has been heat exchanged by the second heat exchanger 108. The hydrogen and the fuel feed are mixed and then sent to the burning equipment 110.

In an embodiment, the reformer 104 can further include a heat balance pipe 104b. The reformer feed first enters the heat balance pipe 104b of the reformer 104 for heat balance with the reformer before entering the catalyst bed 104a for reaction. It is noted that, as compared to the catalyst bed 104a of the reformer 104, the heat balance pipe 104b of the reformer 104 is disposed closer to the upstream 112a of the waste gas exhaust pipe 112, such that more heat energy can be extracted to fully pre-heat the reformer feed.

It is note that, the reformer 104 of the present disclosure is a temperature-controllable apparatus for hydrogen generation, in which the combustion waste gas produced by various burning equipment 110 connected to the reformer 104 is utilized as a heating source for hydrogen generation. Further, the reformer 104 is installed with a temperature controller 105 to monitor the temperature inside the reformer 104 and output a signal to a magnetic valve 117. The temperature controller 105 can be installed inside or outside the reformer 104.

The first heat exchanger 102 is configured to reduce the temperature of the combustion waste gas to be within an operating temperature range of the reformer 104. The first heat exchanger 102 is an apparatus utilizing a fluid for cooling the combustion waste gas. This cooling fluid can include a working fluid used by the burning equipment 110, such as water, air, the fuel feed or a combination thereof. In an embodiment, the cooling fluid of the first heat exchanger 102 is water, for example. The first heat exchanger 102 is connected to a water pump 116 through a pipe 118a, and connected to the burning equipment 110 through pipes 118b and 120b. Water can be heated to a certain degree upon heat exchanged by the first heat exchanger 102, and the heated water can be introduced into the burning equipment 110. In the case that the burning equipment 110 is a hot-water or steam boiler, since the feed water has been preheated, the amount of energy input by the burning equipment 110 for heating water can be reduced, such that the energy efficiency of the burning equipment 110 can be improved.

Specifically, the first heat exchanger 102 controls a switch of the magnetic valve 117 connected between the first heat exchanger 102 and a fluid source (e.g., the water pump 116) according to the signal from the temperature controller 105 of the reformer 104. For instance, the operating temperature range of the reformer 104 is between about 200° C. to 350° C. When the temperature of the reformer 104 approaches an operation upper limit (e.g., 350° C.), the temperature controller 105 can transmit the signal to the magnetic valve 117 at a by-pass of the water pump 116, so that a part of water is provided to the first heat exchanger 102 at the upstream of the waste gas exhaust pipe 112 for cooling the combustion waste gas and thereby slowing down the temperature rise rate of the reformer 104. Before the temperature of the reformer 104 is dropped to a set temperature lower limit (e.g., 200° C.), the magnetic valve 117 at the by-pass of the wafer pump 116 can be turned off, or a water flow amount inside the by-pass can be modulated through the switch of the magnetic valve 117, so that the temperature of the combustion waste gas can be raised or controlled to maintain the reformer 104 within the operating temperature range.

The reformer feed pre-heater 106 is a heat exchanging apparatus, in which the reformer feed of the reformer 104 is heated by the combustion waste gas produced by the burning equipment 110. The reformer feed pre-heater 106 is connected to a feeder 124 for the reformer feed through a pipe 126a, and connected to the reformer 104 through a pipe 126b. In other words, an end of the reformer feed pre-heater 106 is connected to the feeder 124 for the reformer feed, and another end of the reformer feed pre-heater 106 is connected to the reformer 104. The reformer feed includes a hydrocarbon compound with a short carbon chain, such as a $C_{1-5}$ hydrocarbon. In an embodiment, the reformer feed includes a fossil fuel in gaseous state or liquid state, such as natural gas, liquefied petroleum gas (LPG), methanol, ethanol or dimethyl ether. The reformer feed preheated by the reformer feed pre-heater 106 is introduced into the reformer 104 for reforming reaction. In an embodiment, after being heated by the reformer feed pre-heater 106, the reformer feed first enters the heat balance pipe 104b inside the reformer 104 for heat balance with the reformer 104 to reduce the temperature difference between the reformer feed and the reformer, and then enters the catalyst bed 104a in the reformer 104 for reforming reaction.

After the burning equipment 110 is activated to start exhausting the waste gas for a specific period of time so the reformer 104 reaches the set operating temperature, the feeding to the said hydrogen-generation apparatus can be initiated. In the case that the reformer feed is a methanol aqueous solution, the feeding can be initiated when the reformer 104 reaches a range between about 180° C. to 200° C.

More specifically, although the operating temperature of the reforming reaction for the methanol is about 250° C. to 350° C., the feeding to the reformer 104 can be initiated at about 180° C. to 200° C. The reasons are described below with an example of methanol. The hydrogen-generation reformer can achieve a conversion rate of 80% or higher when the operating temperature thereof is usually about 250° C. or higher. However, a combustion with a combustion-supporting hydrogen can be performed even at a low conversion rate (or at a low hydrogen concentration). The combustion can still work although the hydrogen concentration is low, and the overall combustion efficiency is still better than the original combustion without hydrogen. The combustion efficiency becomes higher as the hydrogen partial pressure is gradually increased. Therefore, the earlier the burner receives the combustion-supporting hydrogen, the shorter the required time is spent to burn the raw fuel. Besides, the temperature rise rate for reheating the feed is relatively faster than that of the reformer since the temperature rise of the reformer requires both temperature rises of the entire chamber and the catalyst bed at the same time. Thus, when the reformer 104 reaches 180° C. to 200° C. together with the feed preheated to 300° C., the reaction condition thereof can be equivalent the condition where the catalyst bed is at 250° C. Accordingly, the feeding to the reformer can be initiated at about 180° C. to 200° C. rather than 250° C., so as to obtain the combustion-supporting hydrogen as early as possible.

The second heat exchanger 108 is disposed at the downstream of the reformer feed pre-heater 106, wherein the second heat exchanger 108 can also be omitted upon the actual requirements. The cooling fluid of the second heat exchanger includes water, air, a fuel feed or a combination thereof. Specifically, the second heat exchanger 108 is connected to the water pump 116 through a pipe 120a, and connected to the burning equipment 110 through a pipe 120b. The second heat exchanger 108 is connected to a fuel feeder 130 through a pipe 132a, and connected to the burning equipment 110 through a pipe 132b. In addition, the second heat exchanger 108 is connected to an air supply 134 through a pipe 136a, and connected to the burning equipment 110 through a pipe 136b, wherein an air blower 138 is mounted on the pipe 136b.

The waste heat recovery apparatus 100 of the disclosure includes the reformer feed pre-heater 106 and the second heat exchanger 108 at the downstream of the reformer 104 through which the combustion waste gas flows, so as to fully recover the waste heat of the flue gas which has flowed through the reformer 104, and accordingly improve the overall energy efficiency. Specifically, one heat exchange is performed between the combustion waste gas and the reformer feed at the reformer feed pre-heater 106 for heating the reformer feed, and then another heat exchange is performed between the combustion waste gas and each of air, the fuel feed and water used by the burning equipment 110 at the second heat exchanger 108 for heating air, the fuel feed and water. Accordingly, the waste heat of the flue gas can be fully recovered to accomplish the goal of saving energy.

Figure 1B:
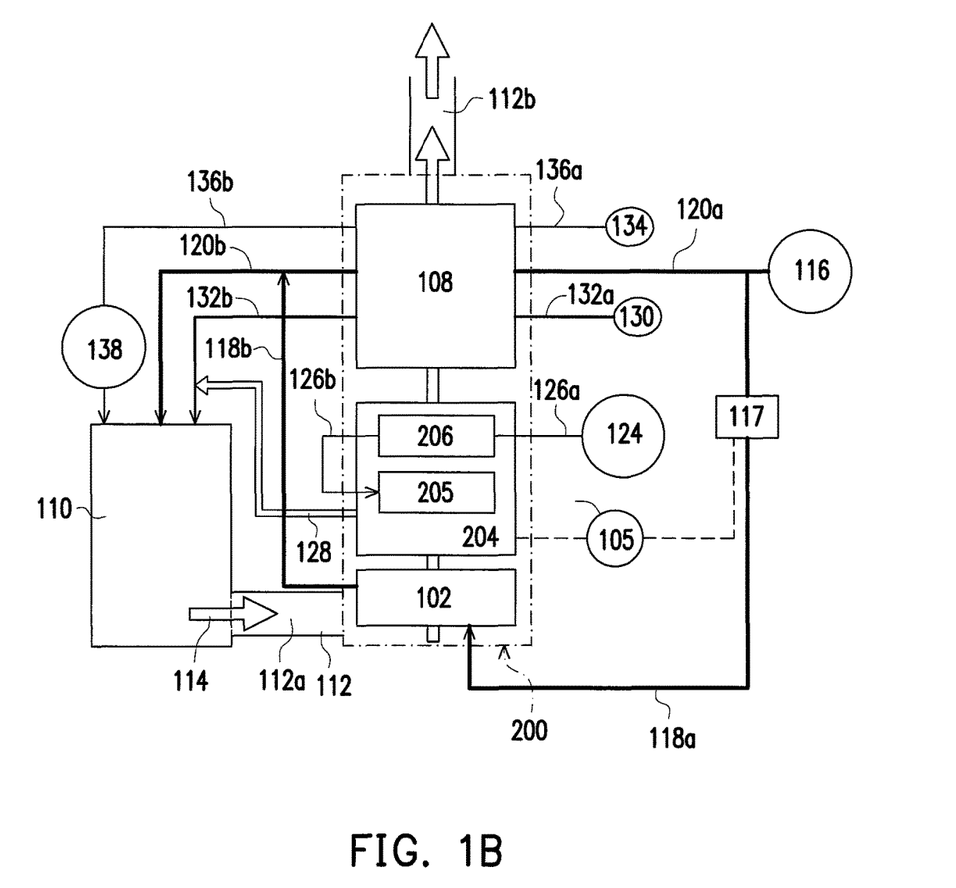
FIG. 1B is a block diagram illustrating a waste heat recovery apparatus according to another exemplary embodiment of the present disclosure.

In an embodiment, the reformer feed pre-heater 106 and the reformer 104 in the waste heat recovery apparatus 100 are two separate components, as shown in FIG. 1A. In another embodiment, a reformer feed pre-heater 206 of a waste heat recovery apparatus 200 can also be integrated in a reformer 204, as shown in FIG. 1B. In this case, the reformer feed preheated by the reformer feed pre-heater 206 is introduced into a catalyst bed 205 of the reformer 204 through the pipe 126b for reforming reaction.

In addition, when the burning equipment 110 is a vertical boiler which exhausts a higher temperature flue gas, each of the waste heat recovery apparatuses 100 and 200 can be an apparatus separated from the burning equipment 110, as shown in FIGS. 1A and 1B. In another embodiment, when the burning equipment 110 is a horizontal boiler which exhausts a lower temperature flue gas, a waste heat recovery apparatus 300 can be partially integrated in the burning equipment 110. Specifically, when the temperature of the flue gas in the waste gas exhaust pipe 112 is not high enough, a first heat exchanger 302 and a reformer 304 can be disposed in the burning equipment 110 to extract sufficient heat energy, and the reformer feed pre-heater 106 and the second heat exchanger 108 can be sequentially disposed on the waste gas exhaust pipe 112, as shown in FIG. 1C.

Figure 1C:
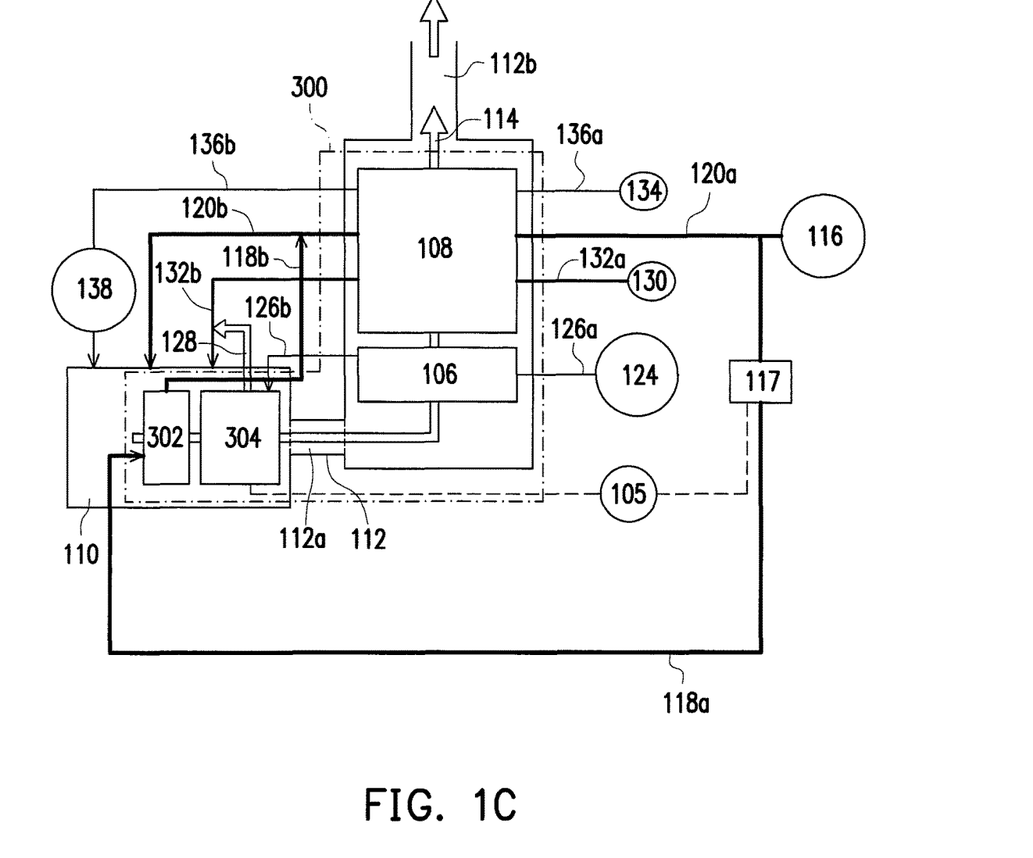
FIG. 1C is a block diagram illustrating a waste heat recovery apparatus according to yet another exemplary embodiment of the present disclosure.

More specifically, referring to FIG. 1C, the waste heat recovery apparatus 300 includes the first heat exchanger 302, the reformer 304 and the reformer feed pre-heater 106 sequentially arranged, wherein the waste gas exhaust pipe 112 is connected to the burning equipment 110, the first heat exchanger 302 and the reformer 304 are disposed in the burning equipment 110, and the reformer feed pre-heater 106 is disposed in the waste gas exhaust pipe 112.

The reformer 304 is installed with the temperature controller 105 to control the temperature inside the reformer 304 at about 400° C. to 800° C. In addition, the reformer 304 can include a catalyst bed and a heat balance pipe (not illustrated). The reformer 304 is a fossil fuel reformer for hydrogen generation in which the reformer feed used includes a $C_{1-5}$ hydrocarbon. It is noted that, since the reformer 304 is disposed in the burning equipment 100 (e.g., the horizontal boiler), more heat energy can be extracted. This temperature setting is adapted to perform the reforming reaction on natural gas or liquefied petroleum gas which requires a higher reaction temperature.

In addition, the waste heat recovery apparatus 300 of FIG. 1C further includes the second heat exchanger 108 disposed at the downstream of the reformer feed pre-heater 106. The cooling fluid of each of the first heat exchanger 302 and the second heat exchanger 108 includes water, air, a fuel feed or a combination thereof.

The foregoing embodiments in which the waste heat recovery apparatuses of FIGS. 1A and 1B are applied in the vertical boiler and the waste heat recovery apparatus of FIG. 1C is applied in the horizontal boiler are provided for illustration purposes, and are not construed as limiting the present disclosure. In other words, based on the actual requirements, the waste heat recovery apparatuses of FIGS. 1A and 1B can be applied in the horizontal boiler, and the waste heat recovery apparatus of FIG. 1C can be applied in the vertical boiler.

Figure 2:
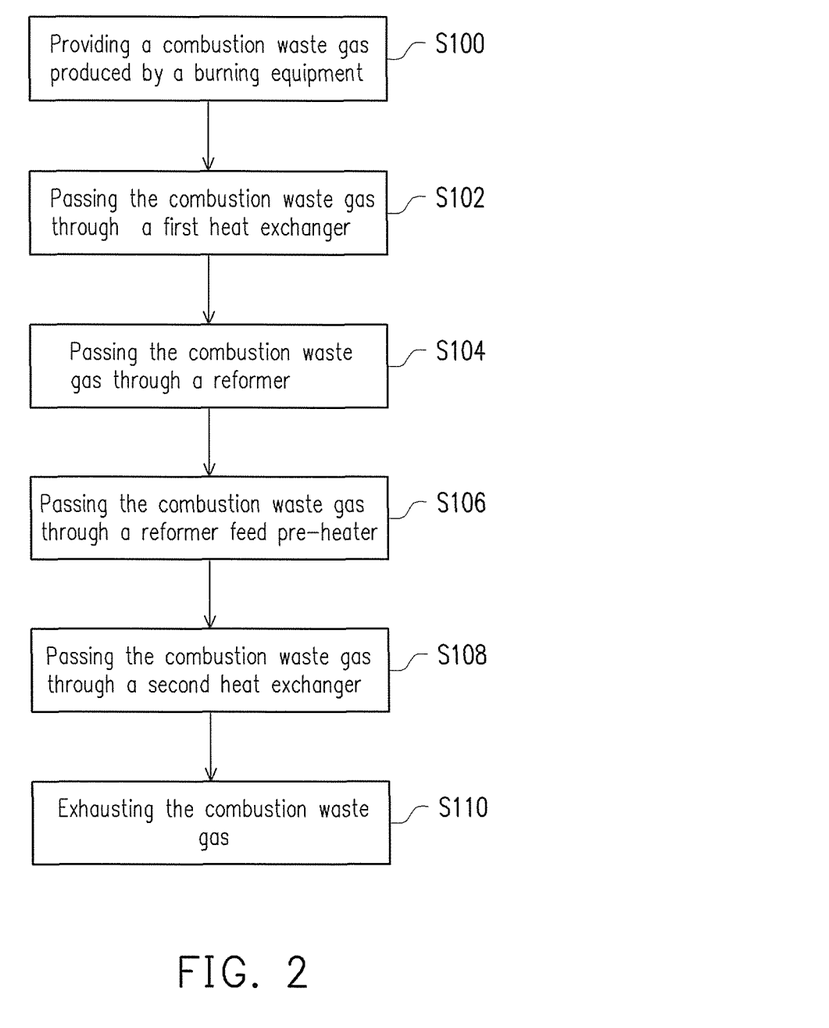
FIG. 2 is a block diagram illustrating a waste heat recovery method according to an embodiment exemplary of the present disclosure.

FIG. 2 is a block diagram illustrating a waste heat recovery method according to an exemplary embodiment of the present disclosure. Referring to FIG. 1A and FIG. 2, in step S100, the combustion waste gas produced by the burning equipment 110 is provided. Next, steps S102 to S106 are sequentially performed, so that the combustion waste gas can be sequentially passed through the first heat exchanger 102, the reformer 104 and the reformer feed pre-heater 106. The cooling fluid of each of the first heat exchanger 102 and the second heat exchanger 108 includes water, air, a fuel feed or a combination thereof. The heat extraction temperature of the first heat exchanger 102 is higher than the heat extraction temperature of the reformer 104, and the heat extraction temperature of the reformer 104 is higher than the heat extraction temperature of the reformer feed pre-heater 106. Herein, the heat extraction temperature is defined as an entrance temperature for the combustion waste gas to enter the designated component. Specifically, the heat extraction temperature of the first heat exchanger 102 is an entrance temperature for the combustion waste gas to enter the first heat exchanger 102; the heat extraction temperature of the reformer 104 is an entrance temperature for the combustion waste gas to enter the reformer 104; and the heat extraction temperature of the reformer feed pre-heater 106 is an entrance temperature for the combustion waste gas to enter the reformer feed pre-heater 106. The reformer feed of the reformer 104 includes a $C_{1-5}$ hydrocarbon. In an embodiment, in the case that the reformer feed of the reformer 104 is a methanol aqueous solution, the heat extraction temperature of the first heat exchanger 102 is about 300° C. to 400° C., the heat extraction temperature of the reformer 104 is about 250° C. to 350° C., and the heat extraction temperature of the reformer feed pre-heater 106 is about 200° C. to 300° C.

In an embodiment, after being heated by the reformer feed pre-heater 106, the reformer feed first enters the heat balance pipe 104b inside the reformer 104 for heat balance with the reformer 104 to reduce the temperature difference between the reformer feed and the reformer 104, and then enters the catalyst bed 104a in the reformer 104 for reforming reaction. In addition, the hydrogen-containing gas produced by the reformer 104 can be introduced into the burning equipment 110.

Thereafter, in step S108, the combustion waste gas is passed through the second heat exchanger 108, so that the remaining heat energy can be recovered by the working fluids. The heat extraction temperature of the reformer feed pre-heater 106 is higher than the heat extraction temperature of the second heat exchanger 108. The heat extraction temperature of the second heat exchanger 108 is about 150° C. to 250° C., for example.

Afterwards, in step S110, the combustion waste gas is exhausted. In the method of the present disclosure, all the working fluids can serve as cooling fluids, the waste heat can be recovered and serve as the energy required in the hydrocarbon reforming for hydrogen generation by disposing the hydrogen-generation reformer, and the generated hydrogen can be mixed and burned with the raw fuel. Thus, the burning efficiency can be improved, and the fuel being used, the carbon deposition and the malodorous waste exhaustion can be therefore reduced.

To sum up, several aspects are provided in the present disclosure below:

(1) In an embodiment, the waste heat of the flue gas from the boiler or the burning equipment can be recovered, so that the waste heat can be used as a heating source of the fossil fuel reformer for hydrogen generation. In other words, the waste heat can be fully recovered and re-used, but an additional heat source for the reformer is not necessary. Moreover, by mixing and burning the generated hydrogen with the raw fuel, the combustion efficiency can be further improved, such that the overall efficiency in energy utilization can be enhanced as compared to the conventional means without the waste heat recovery apparatus of the present disclosure.

(2) In another embodiment, when the temperature of the reformer is raised to approach the operation upper limit due to high temperature of the flue gas, the temperature monitor in the reformer can feedback control the flow direction of the feed (e.g. water) for the boiler or the burning equipment. First, the feed enters the heat exchanger at the upstream of the waste gas exhaust pipe for the heat exchange with the flue gas to reduce the temperature of the flue gas, so that the temperature of the flue gas can be controlled within a suitable range of the reformer to thereby ensure the operation life of the reformer catalyst. In addition to the feedback control of the feed (e.g. water), the feedback signal can also increase the feeding amount of the fossil fuel for absorbing more waste heat of the flue gas. Increasing of the reformer feed for generating more hydrogen does not affect the combustion of the boiler or the burner. The boiler or the burner can still operate normally and even provide an improved combustion efficiency.

(3) In yet another embodiment, unless the working system is shut down, the hydrogen-generation apparatus of the disclosure can constantly generate and provide hydrogen for combustion of the burners even though the feeding of the raw fuel to the boiler is stopped when the operating temperature or vapor pressure is achieved. Therefore, a firing state can be constantly maintained. However, because the heat from burning hydrogen is insufficient for providing a total heat required by the boiler or the burner, the temperature in the apparatus can still be gradually reduced, and the feeding of the fuel is re-provided when the temperature in the apparatus reaches the set lower limit of the temperature. Accordingly, the present system is capable of maintaining the firing state constantly, so that the operation temperature fluctuation in the system is reduced, thereby improving the output stability.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

The invention claimed is:

1. A waste heat recovery apparatus, comprising:
a first heat exchanger, a reformer and a reformer feed pre-heater sequentially and discretely disposed within and from an upstream to a downstream of a same waste gas exhaust pipe, wherein a waste gas temperature at the upstream of the same waste gas exhaust pipe is higher than a waste gas temperature at the downstream,
wherein an end of the reformer feed pre-heater is connected to a feeder for a reformer feed, and another end of the reformer feed pre-heater is connected to the reformer,
wherein the reformer is installed with a temperature controller to control a temperature inside the reformer, and
wherein the reformer comprises a catalyst bed and a heat balance pipe, the heat balance pipe is disposed closer to the upstream of the waste gas exhaust pipe than the catalyst bed of the reformer, and the reformer feed pre-heater is connected to the heat balance pipe feed through a pipe external to the waste gas exhaust pipe.

2. The waste heat recovery apparatus of claim 1, wherein the waste gas temperature at the upstream of the same waste gas exhaust pipe is about 200° C. to 400° C., and the waste gas temperature at the downstream of the same waste gas exhaust pipe is about 100° C. to less than 200° C.

3. The waste heat recovery apparatus of claim 1, wherein the temperature inside the reformer is controlled at about 200° C. to 350° C.

4. The waste heat recovery apparatus of claim 1, wherein the reformer is a fossil fuel reformer for hydrogen generation.

5. The waste heat recovery apparatus of claim 4, wherein a reformer feed used by the fossil fuel reformer for hydrogen generation comprises a $C_{1-5}$ hydrocarbon.

6. The waste heat recovery apparatus of claim 1, wherein a cooling fluid of the first heat exchanger comprises water, air, a fuel feed or a combination thereof.

7. The waste heat recovery apparatus of claim 1, further comprising a second heat exchanger disposed at a downstream of the reformer feed pre-heater.

8. The waste heat recovery apparatus of claim 7, wherein a cooling fluid of the second heat exchanger comprises water, air, a fuel feed or a combination thereof.

9. The waste heat recovery apparatus of claim 7, further comprising:
- a burning equipment, connected to the same waste gas exhaust pipe;
- a water pump, connected to the burning equipment sequentially through a first pipe, the second heat exchanger and a second pipe, and connected to the burning equipment sequentially through the first pipe, a third pipe, the first heat exchanger, a fourth pipe and the second pipe;
- an air supply, connected to the burning equipment sequentially through a fifth pipe, the second heat exchanger, an air blower and a sixth pipe;
- a fuel feeder, connected to the burning equipment sequentially through a seventh pipe, the second heat exchanger and an eighth pipe;
- a magnetic valve, configured to receive a signal from the temperature controller, thereby being turned on or turned off to control a water flow amount through the third pipe; and
- a ninth pipe, transferring hydrogen produced by the reformer to the eighth pipe.

10. A waste heat recovery apparatus, comprising:
a first heat exchanger, a reformer and a reformer feed pre-heater sequentially and discretely arranged within a same waste gas exhaust pipe, wherein the same waste gas exhaust pipe is connected to a burning equipment, and the first heat exchanger and the reformer are disposed in the burning equipment,
wherein an end of the reformer feed pre-heater is connected to a feeder for a reformer feed, and another end of the reformer feed pre-heater is connected to the reformer,
wherein the reformer is installed with a temperature controller to control a temperature inside the reformer,
wherein the waste gas exhaust pipe is at least partly in the burning equipment, and
wherein the reformer comprises a catalyst bed and a heat balance pipe, the heat balance pipe is disposed closer to the upstream of the waste gas exhaust pipe than the catalyst bed of the reformer, and the reformer feed pre-heater is connected to the heat balance pipe feed through a pipe external to the waste gas exhaust pipe.

11. The waste heat recovery apparatus of claim 10, wherein the temperature inside the reformer is controlled at about 400° C. to 800° C.

12. The waste heat recovery apparatus of claim 10, wherein the reformer is a fossil fuel reformer for hydrogen generation.

13. The waste heat recovery apparatus of claim 12, wherein a reformer feed used by the fossil fuel reformer for hydrogen generation comprises a $C_{1-5}$ hydrocarbon.

14. The waste heat recovery apparatus of claim 10, wherein a cooling fluid of the first heat exchanger comprises water, air, a fuel feed or a combination thereof.

15. The waste heat recovery apparatus of claim 10, further comprising a second heat exchanger disposed at a downstream of the reformer feed pre-heater.

16. The waste heat recovery apparatus of claim 15, wherein a cooling fluid of the second heat exchanger comprises water, air, a fuel feed or a combination thereof.

17. The waste heat recovery apparatus of claim 15, further comprising:
- a water pump, connected to the burning equipment sequentially through a first pipe, the second heat exchanger and a second pipe, and connected to the first heat exchanger inside the burning equipment sequentially through the first pipe and a third pipe;
- an air supply, connected to the burning equipment sequentially through a fourth pipe, the second heat exchanger, an air blower and a fifth pipe;
- a fuel feeder, connected to the burning equipment sequentially through a sixth pipe, the second heat exchanger and a seventh pipe;
- a magnetic valve, configured to receive a signal from the temperature controller, thereby being turned on or turned off to control a water flow amount through the third pipe; and
- a ninth pipe, transferring hydrogen produced by the reformer to the seventh pipe.

* * * * *